United States Patent [19]

Benhayoun et al.

[11] Patent Number: 5,776,592
[45] Date of Patent: Jul. 7, 1998

[54] POLYESTER FILMS USABLE FOR CLOSURES AND PROCESS FOR THEIR PREPARATION

[75] Inventors: Jean-Paul Benhayoun, Villeurbanne; Alain Marze, Chassieu; Brunot Melquioni, Lyons, all of France

[73] Assignee: Rhone-Poulenc Films, Miribel, France

[21] Appl. No.: 497,890

[22] Filed: Jul. 3, 1995

[30] Foreign Application Priority Data

Jul. 1, 1994 [FR] France .................... 94 08369

[51] Int. Cl.$^6$ ........................... B32B 7/02
[52] U.S. Cl. .................. 428/221; 428/98; 428/220; 428/221; 264/211.12; 264/291; 264/294
[58] Field of Search ............. 428/98, 220, 221; 264/211.12, 291, 294

[56] References Cited

U.S. PATENT DOCUMENTS

| | | |
|---|---|---|
| 3,702,357 | 11/1972 | Smith, Jr. . |
| 4,867,937 | 9/1989 | Li et al. ............... 264/290.2 |
| 4,985,537 | 1/1991 | Utsumi et al. . |

FOREIGN PATENT DOCUMENTS

| | | |
|---|---|---|
| 0279611 | 8/1988 | European Pat. Off. . |
| 0378955 | 7/1990 | European Pat. Off. . |
| 0386707 | 9/1990 | European Pat. Off. . |
| 0390191 | 10/1990 | European Pat. Off. . |
| 0402861 | 12/1990 | European Pat. Off. . |
| 2046754 | 3/1971 | France . |

*Primary Examiner*—Samuel A. Acquah
*Attorney, Agent, or Firm*—Burns, Doane, Swecker & Mathis, L.L.P.

[57] ABSTRACT

The present invention relates to polyester films which have properties making them suitable for closures, especially of pots for fresh dairy products such as yoghurts, cheeses or desserts. It therefore consists of polyester films which have a thickness of 5 to 30 micrometers and which satisfy the use test, exhibiting a crystallinity higher than or equal to 50%, tensile strengths in the lengthwise direction (MDTS) and in the diagonal directions (±45 degrees relative to the lengthwise direction) (TS45) which are such that: $(MDTS)+(TS45) \leq 40$ kg/mm$^2$ (392.4 MPa) and elongations at break in the lengthwise direction (MDEB) and in the diagonal directions (±45 degrees relative to the lengthwise direction) (EB45) which are such that: $(MDEB)+(EB45) \geq 290\%$. The invention also relates to a process for the preparation of such films and to their use for closures.

24 Claims, No Drawings

POLYESTER FILMS USABLE FOR CLOSURES AND PROCESS FOR THEIR PREPARATION

The present invention relates to polyester films which have properties making them suitable for closures, especially of pots for fresh dairy products such as yoghurts, cheeses or desserts.

Very generally, yoghurts and other dairy products such as especially fromages frais and petits suisses, or various desserts are presented in pots, in most cases made of polystyrene. The closure of such pots is increasingly often made of flexible composite films based on thin polyester films, in contrast to the traditional aluminium foils. Polyester (optionally metallized) film structures coated, on the one hand, with a printable paper and comprising, on the other hand, a sealable and peelable lacquer are often to be found among the composite films employed.

Besides an attractive final appearance, such closures must correspond to various characteristics of processing, of protection of the foodstuffs and of easy opening by the user. These characteristics are the result of printing on the paper in the case of presentation, of heat-sealable coating in the case of seal strength and peelability and, finally, of the polyester film in the case of tear resistance.

The design of the packaging of the products in this type of application is such that the peeling is performed in diagonal directions, that is to say at ±45 and −45 degrees relative to the overall presentation of the film (machine direction). The closure must therefore be capable of being opened in this way without tearing. Experience shows that this is not systematically obtained with polyester films which have a thickness usual in this application and are manufactured industrially by the most commonplace processes. It is found, in fact, that overall, in the case of industrial films which have a total width (called machine width) of several meters, only the middle part corresponds to the desired characteristics, whereas the side parts, generally representing nearly 70% of the total film width, cannot be employed for this type of application. This quite obviously results in a complicated management of film production, since one part can be marketed for the closures, whereas another, larger part must be assigned to other uses. It should be noted, moreover, that the relative quantities which can be employed in the closures and in other applications do not systematically correspond to the available quantities of the various film grades.

It is therefore quite desirable to have the ability, on the one hand, to characterize the films which are suitable for closures when they are manufactured, using measurements of well-defined properties and, on the other hand, above all, to increase, in the case of a given process of manufacture of the polyester film, the percentage of the said film which is suitable for this target application.

The present invention is intended to provide a solution to these problems.

One of the objectives of the present invention consists, therefore, of polyester films which have a thickness of 5 to 30 micrometers, characterized in that they exhibit the following properties:

- a crystallinity higher than or equal to 50%,
- a planar birefringence $\Delta P \leq 0.160$,
- a tensile strength in the lengthwise direction (MDTS) and the lower of the two tensile strengths in the diagonal directions (±45 degrees relative to the lengthwise direction) (TS45) which are such that: $(MDTS)+(TS45) \leq 40$ kg/mm² (392.4 MPa),
- an elongation at break in the lengthwise direction (MDEB) and the higher of the two elongations at break in the diagonal directions (±45 degrees relative to the lengthwise direction) (EB45) which are such that: $(MDEB)+(EB45) \geq 290\%$, and in that they satisfy the use test described below.

The tests used to verify the suitability of the films for use for closures are based on practices which are well known in the profession. In all cases they involve simulation of the actual use, the "closure removal" of a paper-polyester film-heat-sealable lacquer composite being performed in both diagonal directions, on a polystyrene sheet, either by a simple linear sealing of test pieces or by a sealing reproducing that of the pot to be provided with a closure, or else by the practical application of actual pots on a pilot machine.

The use test employed in the present invention corresponds to the first category of tests indicated above. It is performed in the following manner.

The composite is produced as follows. The polyester film, bare or metallized, is made into a composite on one of its faces with paper (at 45 g/m²) and is then coated on the other face with the aid of a heat-sealable lacquer.

The test is carried out on rectangular test pieces of polyester/paper composite, all of which have the same dimensions.

Sealing is carried out with the aid of a sealing iron made up of a hot upper jaw carrying a rod from 2 to 3 mm in diameter and of a planar hot lower jaw. The sealing temperature is of the order of 200° C. The pressure force is of the order of 2.5 kg/cm² (245 kPa) and the sealing time of the order of 1 second.

The polyester/paper composite is arranged on the side of the rod, the polystyrene on the side of the planar jaw.

Welding of the PET/paper composite to its polystyrene support is carried out on each test piece. There is a wait for the sample to cool completely before the closure removal is simulated by pulling the polyester/paper composite manually to separate it from the polystyrene sheet.

The seal strengths are typically of the order of 500 to 800 g/cm² (49 to 78.5 kPa). The result of the test depends on the number of tears of the polyester/paper composite in the course of the operation of closure removal from 10 test pieces. In general, the polyester/paper composite must give closure removal without tearing.

In the case where not more than one tear is produced over the ten test pieces the result of the test is considered to be good.

In the case where two to three tears are produced over the ten test pieces the result of the test is considered to be average.

Above three tears the result of the test is considered to be bad.

The films of the invention are considered to be satisfactory according to the use test if the result of the test is good or average and, preferably, if the result of the test is good.

The films of the invention can also be subjected to a standardized tearing test: Elmendorf method—ISO Standard 6383/2-1983(F).

According to this test, measurements of tear resistance are performed in the diagonal directions defined previously (±45 degrees relative to the lengthwise direction). The criterion adopted is the absolute value of the difference between the tear resistance in one of the diagonal directions and the tear resistance in the other diagonal direction ($\Delta TR45$).

In this test the films of the invention exhibit a $\Delta TR45$ lower than or equal to 6.55 newtons/mm and preferably lower than or equal to 5.7 newtons/mm.

The planar birefringence ΔP is denoted by the relationship $(n_1+n_2)/2-n_3$, in which $n_1$, $n_2$ and $n_3$ denote the refractive indices measured on the film, $n_1$ being the highest refractive index in the plane of the film, $n_2$ being the lowest refractive index in the plane of the film and $n_3$ being the refractive index measured normal to the plane of the film.

The refractive indices $n_1$, $n_2$ and $n_3$ are measured by means of an Abbe refractometer, by R. J. Samuels' method, described in J. Appl. Polymer Sci. Vol. 26, pages 1383–1412 (1981).

Determination of crystallinity:

the relative density d of the samples can be calculated from the average index $n=(n_1+n_2+n_3)/3$, according to the relationship given by A. J. De Vries, C. Bonnebat and J. Beautemps in J. Polym. Sci., Polym. Phys. Edn. vol. 58, page 109 (1977):

$$d=4.028\ (n^2-1)/(n^2+2);$$

if a two-phase model is considered, $d_a$ being the relative density of the amorphous phase and $d_c$ the relative density of the crystalline phase, the crystallinity X will be given by:

$$X=(d-d_a)/(d_c-d_a);$$

in the present text and especially in the examples the values adopted for $d_a$ and $d_c$ are 1.335 and 1.455 respectively, which are those used most generally in the literature (R. Daubeny, C. W. Bunn, C. J. Brown, Proc. Roy. Soc. London, 226, 531-1954).

The measurements of tensile strength and of elongation at break are made according to ASTM Standard D-882 C7.

The films of the invention as defined above preferably exhibit a tensile strength in the lengthwise direction (MDTS) and the lower of the two tensile strengths in the diagonal directions (TS45) which are such that: (MDTS)+(TS45)≦36 kg/mm² (353.2 MPa), and an elongation at break in the lengthwise direction (MDEB) and the higher of the two elongations at break in the diagonal directions (EB45) which are such that: (MDEB)+(EB45)≧320%.

The tensile strength in the lengthwise direction (MDTS) and the lower of the two tensile strengths in the diagonal directions (TS45) are generally such that: (MDTS)+(TS45) ≧25 kg/mm² (245.2 MPa) and the elongation at break in the lengthwise direction (MDEB) and the higher of the two elongations at break in the diagonal directions (EB45) are such that: (MDEB)+(EB45)≦420%.

It is also preferred that the films according to the invention should have a crystallinity higher than or equal to 52%.

Another subject of the invention relates more particularly to films, especially industrial films, which have the characteristics defined above over at least 50% of the machine width and even more preferably over at least 60% of the machine width.

Another characteristic of the films according to the invention, which may be demonstrated in the centre of the machine width, consists in that the refractive index in the lengthwise direction (machine direction) $n_{MD}$, in the transverse direction $n_{TD}$ and in the direction normal to the plane of the film $n_z$ are such that they correspond to the relationships:

$$\Delta n_{1,2}/\Delta P \geq 0.200 \quad (1)$$

$$\Delta n_{2,3}/\Delta P \leq 0.304 \quad (2)$$

$\Delta n_{1,2}$ in the relationship (1) denoting the difference between the indices $n_1$ and $n_2$, $\Delta n_{2,3}$ in the relationship (2) denoting the difference between the indices $n_2$ and $n_3$, $n_1$, $n_2$ and $n_3$ corresponding to $n_{TD}$, $n_{MD}$ and $n_z$ respectively when the indices are measured in the centre of the machine width.

In the case of the applications chiefly aimed at, the films of the invention preferably have a thickness of 8 micrometers to 15 micrometers.

The polyester constituting the films of the invention may be chosen from the polyesters which are usually utilized for obtaining biaxially oriented semicrystalline films. They are film-forming linear polyesters which are crystallizable by orientation and obtained in the usual manner from one or more dicarboxylic aromatic acids or their derivatives (for example esters of lower aliphatic alcohols or halides) and from one or more aliphatic glycols. Examples of aromatic acids which may be mentioned are phthalic, terephthalic, isophthalic, 2,5-naphthalenedicarboxylic and 2,6-naphthalenedicarboxylic acids. These acids may be used in combination with a minor quantity of one or more aliphatic or cycloaliphatic dicarboxylic acids such as adipic, azelaic or hexahydroterephthalic acids. Nonlimiting examples of aliphatic diols which may be mentioned are ethylene glycol, 1,3-propanediol and 1,4-butanediol. These diols may be used in combination with a minor quantity of one or more aliphatic diols which are more condensed in respect of carbon (for example neopentyl glycol) or cycloaliphatic ones (cyclohexanedimethanol).

The crystallizable film-forming polyesters are preferably alkylenediol polyterephthalates and, in particular, the polyterephthalate of ethylene glycol (PET) or of 1,4-butanediol, or copolyesters containing at least 80 mol % of alkylene glycol terephthalate units.

The polyester constituting the film may comprise one or a number of inert fillers, in particular to give it a sufficient slip. These fillers are generally inorganic fillers such as, for example, silica, titanium dioxide, zirconium dioxide, alumina, silica/alumina mixtures, silicates, calcium carbonate and barium sulphate. These fillers may also consist of polymer particles.

The volume-median diameter of the fillers is generally between 1 and 10 micrometers and preferably between 1 and 5 micrometers.

The filler content of the film is usually between 0.02% and 1% by weight relative to the weight of the polyester.

The present invention also consists of a process for the preparation of a biaxially drawn polyester film which has a thickness of 5 to 30 micrometers, satisfying the use test described above, and exhibiting the properties indicated above, characterized in that the polyester used exhibits a viscosity value, measured in a 50/50 mixture by weight of phenol and of 1,2-dichlorobenzene according to ISO Standard 1628-5, of between 55 ml/g and 75 ml/g, in that the film is biaxially drawn with a planar draw ratio lower than or equal to 13 and in that it is heat-set at a temperature higher than or equal to 227° C.

The planar draw ratio is preferably lower than or equal to 12 and heat-setting of the film after the biaxial drawing is preferably conducted at a temperature of 235° C. to 260° C. for a period of a few seconds.

The planar draw ratio is the product of the draw ratio of the film in one direction and the draw ratio in the perpendicular direction, that is to say the product of the lengthwise draw ratio (machine drawing) and of the transverse draw ratio, whatever the order of these drawing operations: biaxial drawing in normal sequence (first in length then across) or the reverse (drawing across and then in length).

The suitable planar draw ratio is preferably obtained with a lengthwise draw ratio of 2.0 to 4.0 and with a transverse draw ratio of 3.0 to 5.0.

Still more preferably, the lengthwise draw ratio employed is from 2.5 to 3.5 and the transverse draw ratio employed is from 3.5 to 4.5.

The planar draw ratio is generally equal to or higher than 6.

It has been observed that a polyethylene terephthalate whose viscosity value, according to the standard indicated above, is between 58 ml/g and 70 ml/g is very particularly suitable for obtaining a film exhibiting the properties required for it to be employed in the closure.

Apart from the selection described above, of the parameters of planar draw ratio, of polyester viscosity value and of heat-setting temperature, the methods of preparation of the film are those which are usually employed for polyester film of this type in the packaging field.

The examples which follow illustrate the invention.

EXAMPLES 1 TO 4 AND COMPARATIVE EXAMPLES A, B AND C

In these examples a polyethylene terephthalate (PET) is employed which has a viscosity value (measured according to the standard indicated above) of 67 ml/g, a glass transition temperature (Tg) of 80° C. (measured at 20° C./min on a DuPont 1090 differential thermal analysis apparatus) and a crystallization temperature (Tc) of 170° C. (measured under the same conditions as the Tg) and containing 0.1% by weight of a filler consisting of silica particles which have a volume-median diameter of 3.5 μm.

The PET is extruded in the molten state through a slot die, in the form of a thick film which is cooled to 20° C. by electrostatic pinning onto a cooling drum, so as to form an amorphous film. The amorphous film thus obtained is next subjected to a lengthwise MD drawing, at a temperature of 110° C. and with a ratio shown in Table 1 below (LD ratio), by passing successively over a slow roller, then over a fast roller at 20° C. The monoaxially drawn film is then subjected to a transverse drawing at 125° C. with a ratio The biaxially drawn film (which has a thickness of 12 μm) is next subjected to heat-setting at a temperature shown in Table 1.

The measurement of the refractive indices, of the elongations at break and of the tensile strengths is performed as described above.

Finally, the films are subjected to the use test and to the Elmendorf tear test, also described above.

The draw ratios of the films (PL ratio in the case of the planar draw ratio) and the heat-setting temperature (Heat) used are collated in Table 1.

The refractive indices, the values given by application of the relationships (1) and (2) and the result of the use test are collated in Table 2.

The value of ΔP, the crystallinity (X%) of the polyester employed, the values of the elongations at break (MDEB and EB45) and of the tensile strengths (MDTS and TS45 in kg/mm$^2$, and in MPa between brackets), the result of the use test (satisfactory=yes; unsatisfactory=no) and the ΔTR45 in N/mm are collated in Table 3.

TABLE 1

| Examples | LD ratio | TD ratio | PL ratio | Heat (°C.) |
|---|---|---|---|---|
| Example 1 | 3.0 | 3.8 | 11.4 | 235 |
| Example 2 | 3.0 | 3.8 | 11.4 | 240 |
| Example 3 | 3.1 | 3.8 | 11.8 | 230 |
| Example 4 | 3.0 | 3.8 | 11.4 | 230 |
| Test A | 3.2 | 3.8 | 12.2 | 225 |
| Test B | 3.1 | 3.8 | 11.8 | 225 |
| Test C | 3.45 | 4.15 | 14.3 | 237 |

TABLE 2

| Examples | $n_{TD}$ ($n_1$) | $n_{MD}$ ($n_2$) | $n_Z$ ($n_3$) | Relationship 1 | Relationship 2 | Test |
|---|---|---|---|---|---|---|
| Example 1 | 1.6785 | 1.6380 | 1.5025 | 0.259 | 0.2913 | yes |
| Example 2 | 1.6793 | 1.6342 | 1.5041 | 0.295 | 0.2826 | yes |
| Example 3 | 1.6760 | 1.6420 | 1.4991 | 0.212 | 0.3029 | yes |
| Example 4 | 1.6764 | 1.6404 | 1.5010 | 0.228 | 0.2964 | yes |
| Test A | 1.6709 | 1.6470 | 1.4977 | 0.148 | 0.3103 | no |
| Test B | 1.6737 | 1.6435 | 1.4985 | 0.188 | 0.3055 | no |
| Test C | 1.6746 | 1.6472 | 1.4979 | 0.167 | 0.3120 | no |

TABLE 3

| Examples | ΔP | X % | MDTS | TS45 | MDTS + TS45 | MDEB | EB45 | MDEB + EB45 | Test | ΔTR45 (N/mm) |
|---|---|---|---|---|---|---|---|---|---|---|
| Ex 1 | 0.1558 | 53.5 | 17.5 (171.7) | 16.3 (159.9) | 33.8 (331.6) | 160% | 195% | 355% | yes | 4.9 |
| Ex 2 | 0.1526 | 52.6 | 16.2 (158.9) | 16.5 (161.9) | 32.7 (320.8) | 180% | 180% | 360% | yes | 3.1 |
| Ex 3 | 0.1599 | 52.4 | 18.7 (183.4) | 19.9 (195.2) | 38.6 (378.6) | 149% | 146% | 295% | yes | 5.4 |
| Ex 4 | 0.1574 | 52.7 | 19.0 (186.4) | 20.2 (198.2) | 39.2 (384.6) | 161% | 156% | 317% | yeu | 6.2 |
| Test A | 0.1613 | 51.4 | 21.4 (209.9) | 22.1 (216.8) | 43.5 (426.7) | 146% | 141% | 287% | no | 7.65 |
| Test B | 0.1601 | 51.5 | 19.6 (192.3) | 21.2 (208.0) | 40.8 (400.3) | 141% | 144% | 285% | no | 6.05 |
| Test C | 0.163 | 53.9 | 20.7 (203.1) | 21.5 (210.9) | 42.2 (414.0) | 132% | 151% | 283% | no | 6.9 |

We claim:

1. A polyester film, said film having
   a) a thickness of 5 to 30 micrometers;
   b) a crystallinity higher than or equal to 50%;
   c) a planar birefringence $\Delta P \leq 0.160$;
   d) a tensile strength in the lengthwise direction (MDTS) and the lower tensile strength of a first and a second diagonal direction (±45 degrees relative to the lengthwise direction) (TS45), wherein (MDTS)+(TS45)≦40 kg/mm² (392.4 MPa); and
   e) an elongation at break in the lengthwise direction (MDEB) and the higher elongation at break of said first and said second diagonal direction (EB45), wherein (MDEB)+(EB45)≧290%, and wherein the film satisfies a use test.

2. The film according to claim 1, wherein the film in the Elmendorf test has an absolute value of the difference between a tear resistance in the first diagonal direction and a tear resistance in the second diagonal direction (ΔTR45) lower than or equal to 6.55 newtons/mm.

3. The film according to claim 1, wherein (ΔTR45) is lower than or equal to 5.7 newtons/mm.

4. The film according to claim 1, wherein (MDTS)+(TS45)≦36 kg/mm² (353.2 MPa) and wherein (MDEB)+(EB45)≧320%.

5. The film according to claim 2, wherein (MDTS)+(TS45)≦36 kg/mm² (353.2 MPa) and wherein (MDEB)+(EB45)≧320%.

6. The film according to claim 1, wherein (MDTS)+(TS45)≧25 kg/mm² (245.2 MPa) and wherein (MDEB)+(EB45)≦420%.

7. The film according to claim 2, wherein (MDTS)+(TS45)≧25 kg/mm² (245.2 MPa) and wherein (MDEB)+(EB45)≦420%.

8. The film according to claim 1, wherein said crystallinity is higher than or equal to 52%.

9. The film according to claim 2, wherein said crystallinity is higher than or equal to 52%.

10. The film according to claim 1, wherein the polyester is a polyterephthalate of an alkylenediol.

11. The film according to claim 1, wherein the polyester is selected from the group consisting of a polyterephthalate of ethylene glycol, a polyterephthalate of 1,4-butanediol, and a copolyester comprising at least 80 mol % of alkylene glycol terephthalate units.

12. The film according to claim 1, having a refractive index in the lengthwise direction (machine direction) $n_{MD}$, a refractive index in the transverse direction $n_{TD}$, and a refractive index in the direction normal to the plane of the film $n_z$, wherein $$\Delta n_{1,2}/\Delta P \geq 0.200 \quad (1)$$

and $$\Delta n_{2,3}/\Delta P \leq 0.304 \quad (2)$$

wherein $\Delta n_{1,2}$ is the difference between indices $n_1$ and $n_2$, and $\Delta n_{2,3}$ is the difference between indices $n_2$ and $n_3$, wherein $n_1$, $n_2$, and $n_3$ correspond to $n_{TD}$, $n_{MD}$ and $n_z$ respectively when $n_{TD}$, $n_{MD}$ and $n_z$ are measured in the center of the machine width of the film.

13. A process for the preparation of the polyester film of claim 1, wherein the polyester film
    a) has a viscosity value measured according to ISO standard 1628-5 of between 55 ml/g and 75 ml/g,
    b) is biaxially drawn with a planar draw ratio lower than or equal to 13, and
    c) is heat-set at a temperature higher than or equal to 227° C.

14. The process according to claim 13, wherein the planar draw ratio is less than or equal to 12.

15. The process according to claim 13, wherein the planar draw ratio is obtained with a lengthwise draw ratio of 2.0 to 4.0.

16. The process according to claim 13, wherein the planar draw ratio is obtained with a lengthwise draw ratio of 2.5 to 3.5.

17. The process according to claim 14, wherein the planar draw ratio is obtained with a lengthwise draw ratio of 2.0 to 4.0.

18. The process according to claim 14, wherein the planar draw ratio is obtained with a lengthwise draw ratio of 2.5 to 3.5.

19. The process according to claim 13, wherein the planar draw ratio is obtained with a transverse draw ratio of 3.0 to 5.0.

20. The process according to claim 13, wherein the planar draw ratio is obtained with a transverse draw ratio of 3.5 to 4.5.

21. The process according to claim 14, wherein the planar draw ratio is obtained with a transverse draw ratio of 3.0 to 5.0.

22. The process according to claim 14, wherein the planar draw ratio is obtained with a transverse draw ratio of 3.5 to 4.5.

23. The process according to claim 13, wherein the polyester film is heat-set at a temperature of 235° C. to 260° C.

24. The process according to claim 13, wherein the polyester film is a polyethylene terephthalalte with a viscosity value between 58 ml/g and 70 ml/g.

* * * * *